Feb. 16, 1926. 1,572,889
I. C. DEGEN
SAFETY PARACHUTE FOR AERONAUTS
Filed May 20, 1924 2 Sheets-Sheet 1
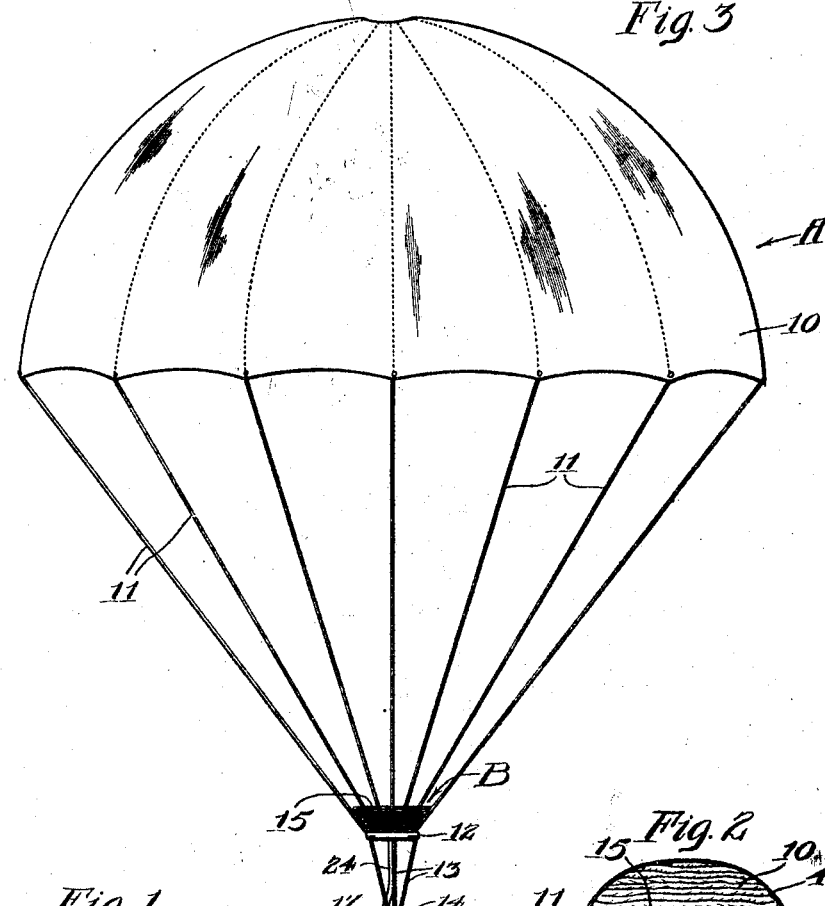
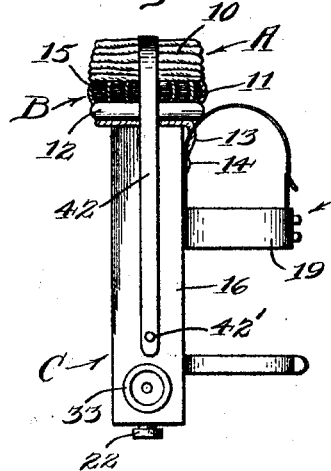
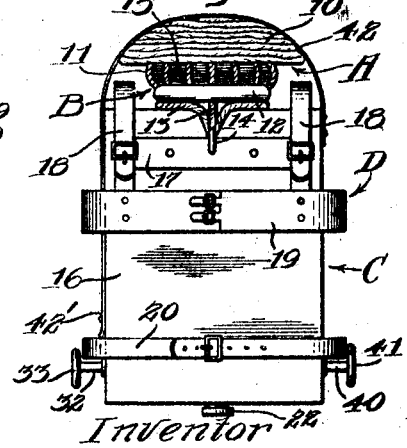
Inventor
Irwin Charles Degen
By Bradbury & Caswell
Attorneys Feb. 16, 1926.
I. C. DEGEN
1,572,889
SAFETY PARACHUTE FOR AERONAUTS
Filed May 20, 1924   2 Sheets-Sheet 2
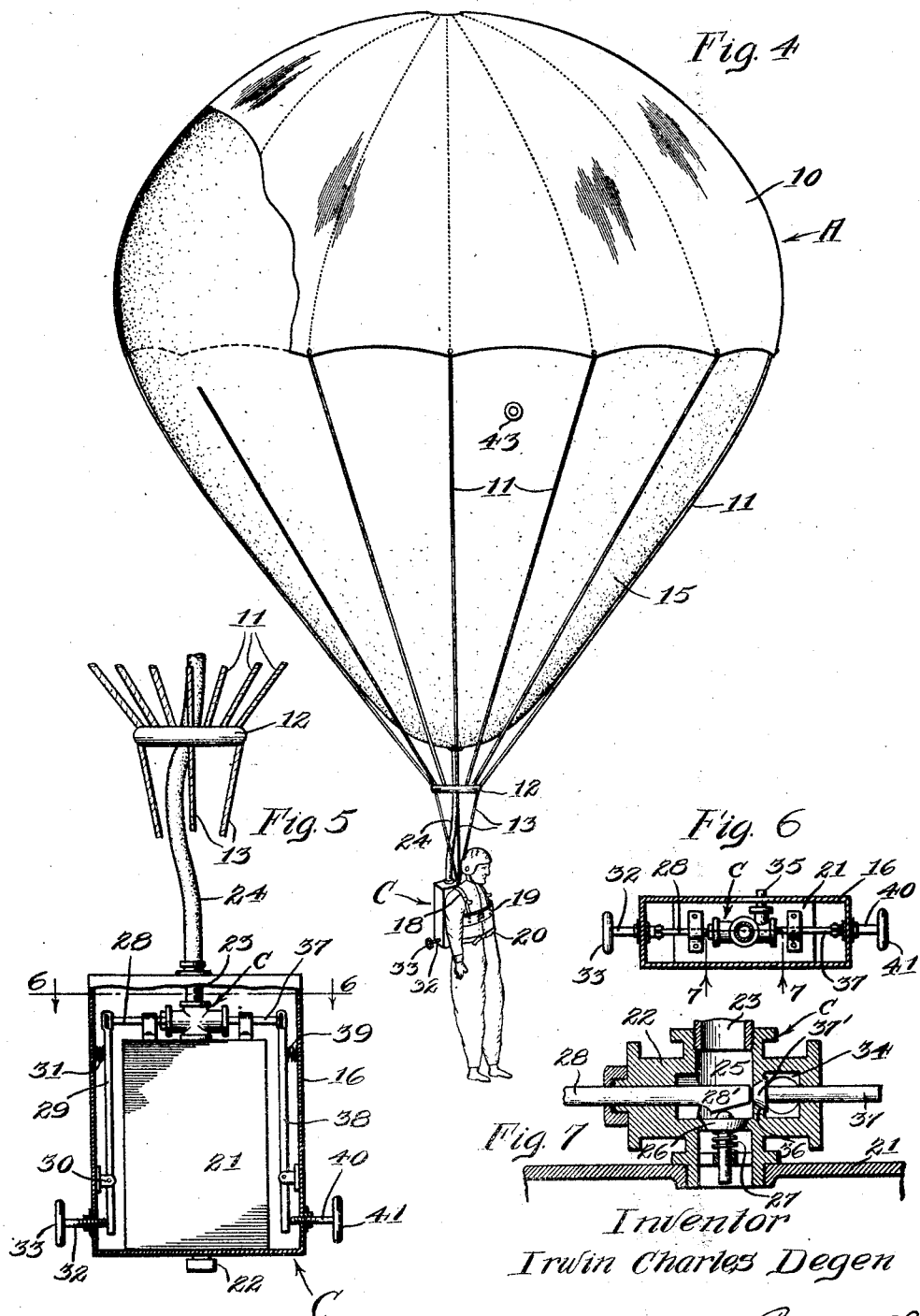
Inventor
Irwin Charles Degen
By Bradbury & Caswell
Attorneys Patented Feb. 16, 1926.

1,572,889

UNITED STATES PATENT OFFICE.

IRWIN CHARLES DEGEN, OF CHASKA, MINNESOTA.

SAFETY PARACHUTE FOR AERONAUTS.

Application filed May 20, 1924. Serial No. 714,558.

*To all whom it may concern:*

Be it known that I, IRWIN CHARLES DEGEN, a citizen of the United States, residing at Chaska, in the county of Carver and State of Minnesota, have invented a new and useful Safety Parachute for Aeronauts, of which the following is a specification.

My invention relates to improvements in devices designed for the safe descent and landing of persons from aeronautical vehicles.

The lately improved parachutes have minimized to a large extent, the danger in descent from aeroplanes and other aircraft, but occasional fatalities and injuries still occur. These accidents are largely due to failure of the parachute body to open after the aviator has leaped from his craft or to an unfortunate landing in boggy or timbered lands or in water.

Broadly, it is my object to supply a device by the use of which an aerial navigator, upon leaving his craft, may safely descend and during such descent control or completely arrest his fall, as desired, to bring about a landing at a suitable place.

Another object is to provide a device of the present nature embodying a combined parachute and balloon that may function as a simple parachute or as a balloon, the parachute, in the latter instance serving as a cage for the balloon structure.

A further object is to provide an aeronautical safety device, as above, the parachute structure being adapted to supply the initial sustaining force and the balloon structure adapted to later supplant the parachute structure in further arresting the fall of the user or in completely buoying him up.

An additional object is to supply a device of this nature, wherein the balloon structure is caged by the parachute structure, said balloon structure operating positively to arrest the fall of the user in the event of failure in the functioning of the parachute structure.

With the foregoing and other objects in view, which will appear in the following description, the invention resides in the novel combination and arrangement of parts and in the details of construction hereinafter described and claimed.

In the drawings, Figs. 1 and 2 are elevational views of a device embodying my invention, the balloon bag and parachute body being collapsed; Fig. 3 is a perspective view illustrating said device with the parachute structure extended; Fig. 4 is a similar view showing the balloon bag inflated and caged within the parachute structure; Fig. 5 is a fragmentary elevational view illustrating particularly the gas tank case and valve actuators, the former being broken away to disclose the latter; Fig. 6 is a sectional view taken as on the line 6—6 of Fig. 5 and Fig. 7 is an enlarged sectional view taken as on the line 7—7 of Fig. 6.

Referring to the drawings, it will be observed that my invention includes a parachute element A and a ballon element B. The parachute element A embodies the ordinary umbrella-shaped body 10 of suitable fabric with the usual weight supporting strands or cords 11 depending from the lower margin of said body 10. A ring 12 common to the cords 11 and to which each of said cords is attached, has suspension leaders 13 depending therefrom, the lower ends of said leaders being attached to a hook-like loop 14. The balloon element B includes a bag 15 of suitable gas tight material, said bag being confined within the cage-like structure of the body 10 and cords 11 of the parachute element. This bag 15 together with the parachute element A is collapsible into close compass, said bag being shaped to conform with the extended parachute body 10 and cords 11 (Fig. 4), when inflated.

A gas supplying device C and harness D are carried by the suspension leaders 13. Said device C includes a case 16 at the front of which is a fixed bar 17, said bar being apertured medially thereof to receive the hook-like loop 14. Combined hanger and shoulder straps 18 secured to the ends of the bar 17 are also attached to a wide chest strap 19. A user attaches this strap 19 and said shoulder straps 18 to his body as shown in Fig. 4 and, further, buckles the belt 20 about his waist, said belt being caught at the back thereof to the front of the case 16 as shown in Fig. 3.

Within the case 16 is a tank 21 adapted to contain a compressed gas or liquefied gas suitable for balloon purposes and provided with a suitable filler fitting 22 reaching through the bottom of the case. At the top of the tank 21 is a two-way valve C, the housing 22 being fitted with a nipple 23 reaching through the top of the case 16, said nipple 23 being connected with the balloon bag 15 through the medium of a flexible tube 24. Within the valve housing c is a chamber 25 leading from the interior of the tank 21 to the nipple 23. A valve-head 26 normally obstructing this passageway, is held seated against the spring 27 and pressure within the tank 21 by the cam-head 28' of a reciprocable rod 28. An upright lock-lever 29 pivoted between its ends in a bracket 30 at the side of the case 16 has a slotted pivotal connection at its upper end with the rod 28. A spring 31, interposed between said end of said lever 29 and the case 16, operates through the lever 29, rod 28 and cam-head 28' on said rod to close and hold the valve-head 26 seated as shown in Fig. 7. Opposing said action of said spring 31 is a stem 32 threaded in the side of the case 16, the inner end of the stem bearing against the lower end of the rock-lever 29, while the outer end of said stem is supplied with a hand-wheel 33 for turning the same. Within the valve housing c is a second chamber 34, the same opening into the outer air through an exhaust nipple 35 and into the main chamber 25 of the housing c through an opening 36. This opening is normally closed by a valve-head 37' on a reciprocable rod 37 similar to the rod 28, said rod 37 being actuated through a rock-lever 38, spring 39, stem 40 and handwheel 41, all like the similar parts hereinbefore described.

As carried for emergency uses or otherwise, the device is kept in the form shown in Figs. 1 and 2, the tank 21, of course, being charged with gas under pressure. A person intending to descend from a craft in flight, applies the compacted device (Figs. 1 and 2) to his person through the medium of the harness D. The releasing strap 42 is unsnapped at its removably fastened end 42' to free the parachute and balloon elements from the case 16. Leaping into the air, the parachute body A will ordinarily become extended thus retarding the fall of the aviator, as usual. Should the body A fail to open, the aviator need only to manipulate the hand-wheel 33 and thereby inflate the bag 15 sufficiently to break his fall. If, in descending under the restraint effected by the parachute body A or by the partially inflated bag, the aviator discovers that the landing beneath is dangerous, he may further manipulate the hand-wheel 33 and thereby cause the bag 15 to be inflated sufficiently to buoy him up. The bag 15, equipped with a conventional safety valve 43, is safe against excessive charges of gas. With his descent completely arrested, the aviator may drift with the wind until a suitable landing is found, whereupon, by manipulation of the hand-wheel 41, he may allow the escape of sufficient gas from the bag to permit of the continuation of his descent. From the foregoing it will be understood that a person equipped with my improvement and launching himself from an aircraft may do so with reasonable assurance of a gentle landing at a safe place.

Among the several advantages resident in my improvement is the feature of combining a parachute and a balloon structure. This feature permits of a reduction in structural weight and provides for the compacting of the device in small compass.

Changes in the specific form of my invention, as herein disclosed, may be made within the scope of what is claimed without departing from the spirit of my invention.

Having described my invention, what I claim as new and desire to protect by Letters Patent is:

1. In a device of the class described, a parachute structure, a balloon bag caged therein, said parachute structure embodying suspension means for embracing the body of a user, a tank for compressed gas supply associated with said suspension means, a gas conduit leading from said tank to said bag and means for opening the gas supply into the bag from said tank.

2. In a device of the class described, a parachute structure, a balloon bag caged therein, said parachute structure embodying suspension means for embracing the body of a user, a tank for compressed gas supply associated with said suspension means, a gas conduit leading from said tank to said bag and means for opening the gas supply into the bag from said tank, said means being accessible to a user carried in said suspension means.

3. In a device of the class described, a parachute structure, a balloon bag caged therein free of the top thereof and foldable into the bottom of said structure, and means carried by the parachute structure for inflating the balloon bag therein.

4. In a device of the class described, a parachute structure, a balloon bag caged therein free of the top thereof and foldable into the bottom of said structure, and means associated with the parachute structure for inflating and deflating the balloon bag at the will of a user carried by said parachute structure.

In testimony whereof, I have signed my name to this specification.

IRWIN CHARLES DEGEN.